United States Patent
Lin et al.

(10) Patent No.: US 10,216,745 B2
(45) Date of Patent: Feb. 26, 2019

(54) CONTROL METHOD OF RECOVERABLE FILE PROTECTION DEVICE AND PROTECTION METHOD OF RECOVERABLE FILE

(71) Applicant: Inwellcom Technology Co., Ltd., Taipei (TW)

(72) Inventors: Jian-Jr Lin, Taipei (TW); Ke-Sen Huang, Taipei (TW); Chien-Hsing Chiang, Taipei (TW)

(73) Assignee: Inwellcom Technology Co., Ltd., Taipei (TW)

( * ) Notice: Subject to any disclaimer, the term of this patent is extended or adjusted under 35 U.S.C. 154(b) by 224 days.

(21) Appl. No.: 15/213,640

(22) Filed: Jul. 19, 2016

(65) Prior Publication Data
US 2017/0024401 A1    Jan. 26, 2017

(30) Foreign Application Priority Data
Jul. 23, 2015   (TW) .............................. 104123944 A

(51) Int. Cl.
G06F 17/30    (2006.01)
H04L 29/06    (2006.01)
G06F 21/60    (2013.01)

(52) U.S. Cl.
CPC .. *G06F 17/30082* (2013.01); *G06F 17/30165* (2013.01); *G06F 21/602* (2013.01); *H04L 63/0428* (2013.01); *H04L 63/083* (2013.01)

(58) Field of Classification Search
CPC ......... G06F 17/30165; G06F 17/30082; G06F 21/602; H04L 63/083; H04L 63/0428
See application file for complete search history.

(56) References Cited

U.S. PATENT DOCUMENTS

2003/0208686 A1*  11/2003  Thummalapally ..........................
                                                G06F 21/6218
                                                      713/193
2009/0178144 A1*  7/2009  Redlich .............. G06F 21/6209
                                                       726/27
2016/0239668 A1*  8/2016  Bellert ................... G06F 21/10

* cited by examiner

*Primary Examiner* — Harunur Rashid
(74) *Attorney, Agent, or Firm* — C. G. Mersereau; DeWitt LLP

(57) ABSTRACT

A control method of a recoverable file protection device and a protection method of a recoverable file are provided. After a file owner sets a secured content in an unprotected data, a secured content protection mode is selected. In accordance with the secured protection mode, the recoverable file protection device can move the secured content and the marked content can replace the secured content. An authentication key is inputted to encrypt the secured content. If a user would like to open the file, the user is requested to verify an identification data. If the identification data complies with the authentication key, the recoverable file protection device moves the secured content to recover the original content. If the identification data doesn't comply with the authentication key, the file content without the secured content is opened. Therefore, a security of an e-file can be achieved.

35 Claims, 11 Drawing Sheets

CONTROL METHOD OF RECOVERABLE FILE PROTECTION DEVICE AND PROTECTION METHOD OF RECOVERABLE FILE

CROSS-REFERENCE TO RELATED APPLICATIONS

This application claims the benefit of Taiwan patent application No. 104123944, filed on Jul. 23, 2015, the disclosure of which is incorporated herein in its entirety by reference.

BACKGROUND OF THE INVENTION

1. Field of the Invention

The present invention relates to a control method of a recoverable file protection device and a protection method of a recoverable file, and more particularly relates to a control method of a recoverable file protection device and a protection method for a secured content of the recoverable file in accordance with a secured content protection mode.

2. Description of Related Art

Owing to the rising awareness of environmental protection, people gradually implement electronic means to transfer data. During electronic file (e-file) transferring, if the e-file is a confidential file without any protection, an unpredictable loss and damage for a company or a person might occur.

The conventional e-file protection technique is to secure it by encrypting. Once the user would like to access the content of an encrypted e-file, the encrypted c-file has to be decrypted first.

However, according to the aforementioned method, if the file owner only hopes to show partial content in the e-file to the user, the e-file has to be redacted before provided to the user. If the e-file is not redacted before providing to the user, the user can access the whole content in the e-file. Moreover, if the file owner will like to provide many different users to access the e-file and the content for each one of the users is different, the e-file has to generate many copies and the content in each copy of the e-file redacted in accordance with a limitation of the user's access authority. The aforementioned method is wasting time and many duplicated documents have to be maintained and the confidentiality is under extreme risk.

In addition, the conventional method also implements a masking method to erase confidential information in the e-file and the meaningless notations are used to replace the erased content for the user so as to achieve security effect.

However, after the procedure to mask the content of the e-file in accordance with the aforementioned method is performed, the content of the e-file cannot be recovered completely. When the file owner would like to edit the original c-file and provide the e-file to different users, the file owner has to rewrite the erased content within the e-file and mask the content of the e-file again in accordance with the access authority of the users so as to let the user access the file. Accordingly, it is inconvenient for the file owner to operate.

According to the aforementioned description, the problem of the inconvenience of the encrypting manner of the protection method and the security of the e-file indeed needs to be further improved in related industries.

SUMMARY OF THE INVENTION

In order to overcome a secure and inconvenient problem of the aforementioned e-file, a control method of a recoverable file protection device is disclosed in the present invention and comprises steps of:

displaying a file including a normal data zone and a customized hidden zone by the recoverable file protection device, and storing an unprotected data in the normal data zone;

opening a file protection program via the recoverable file protection device by a file owner;

setting a secured content in the unprotected data by the file owner after opening the file protection program via the recoverable file protection device;

setting a secured content protection mode after setting the secured content in the recoverable file protection device;

moving the secured content from the unprotected data to the customized hidden zone in accordance with the secured content protection mode by the recoverable file protection device;

saving the unprotected data without the secured content in the normal data zone to form a first protection data by the recoverable file protection device;

encrypting the secured content with an authentication key inputted by the file owner via the recoverable file protection device;

requesting a user to input an identification verifying data when the recoverable file protection device receives a control signal to open the file; and comparing the identification verifying data with the authentication key by the recoverable file protection device;

moving the secured content from the customized hidden zone and the first protection data from the normal data zone to recover the unprotected data via the file protection program in the recoverable file protection device when the identification verifying data complies with the authentication key; and displaying the first protection data by the recoverable file protection device when the identification verifying data does not comply with the authentication key.

In order to achieve the aforementioned objective, the present invention also provides a control method of a recoverable file protection device comprising the following steps:

connecting the recoverable file protection device with a server;

receiving a file sharing protection rule and an authentication key from the server, and the file sharing protection rule including a file secured content and a file secured content protection mode;

displaying a file including a normal data zone and a customized hidden zone by the recoverable file protection device, and saving an unprotected data in the normal data zone;

opening a file protection program by a file owner in the recoverable file protection device;

setting the file secured content in accordance with the file sharing protection rule after opening the file protection program in the recoverable file protection device and moving the file secured content to the customized hidden zone in accordance with the file secured content protection mode of the file sharing protection rule;

saving the unprotected data without the file secured content in the normal data zone to form a first protection data by the recoverable file protection device;

encrypting the file secured content with the authentication key by the recoverable file protection device;

requesting a user to input an identification verifying data when the recoverable file protection device receives a control signal to open the file;

comparing the identification verifying data with the authentication key by the recoverable file protection device;

moving the file secured content from the customized hidden zone and the first protection data from the normal data zone to recover the unprotected data by the file protection program of the recoverable file protection device when the identification verifying data complies with the authentication key; and displaying the first protection data by the recoverable file protection device when the identification verifying data does not comply with the authentication key.

In order to achieve the aforementioned objective, the present invention also proposes a protection method of a recoverable file comprising the following steps:

including a normal data zone and a customized hidden zone in a file and saving an unprotected data in the normal data zone;

opening a file protection program;

setting a secured content in the unprotected data;

setting a secured content protection mode after setting the secured content;

moving the secured content to the customized hidden zone in accordance with the secured content protection mode;

saving the unprotected data without the secured content in the normal data zone to form a first protection data;

inputting an authentication key to encrypt the secured content;

requesting to input an identification verifying data when receiving a control signal to open the file;

moving the secured content from the customized hidden zone and the first protection data of the normal data zone to recover the unprotected data when the identification verifying data complies with the authentication key; and displaying the first protection data when the identification verifying data does not comply with the authentication key.

According to the aforementioned description, in the control method of the recoverable file protection device and the protection method of the recoverable file, the file owner can provide different secured contents to different users in accordance with the users' different access authorities in the unprotected data. After verifying the identification and access authority of the user, the protected file is recovered to be the unprotected data to reduce the inconvenience of the user to produce the e-file and enhance a confidentiality effect.

DETAILED DESCRIPTION OF THE PREFERRED EMBODIMENT

These and other aspects of the embodiments herein will be better appreciated and understood when considered in conjunction with the following description and the accompanying drawings.

Figure 1A:
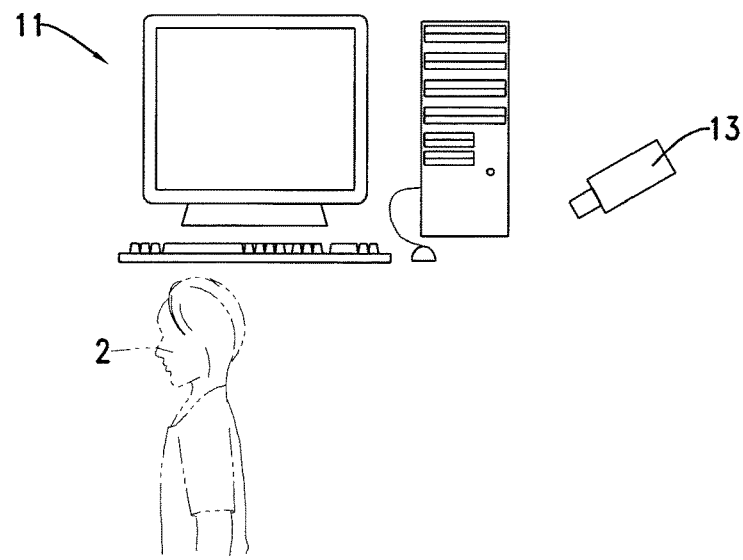
FIG. 1A and FIG. 1B are structural views of a control method of a recoverable file protection device in a first embodiment of the present invention.
Figure 1B:
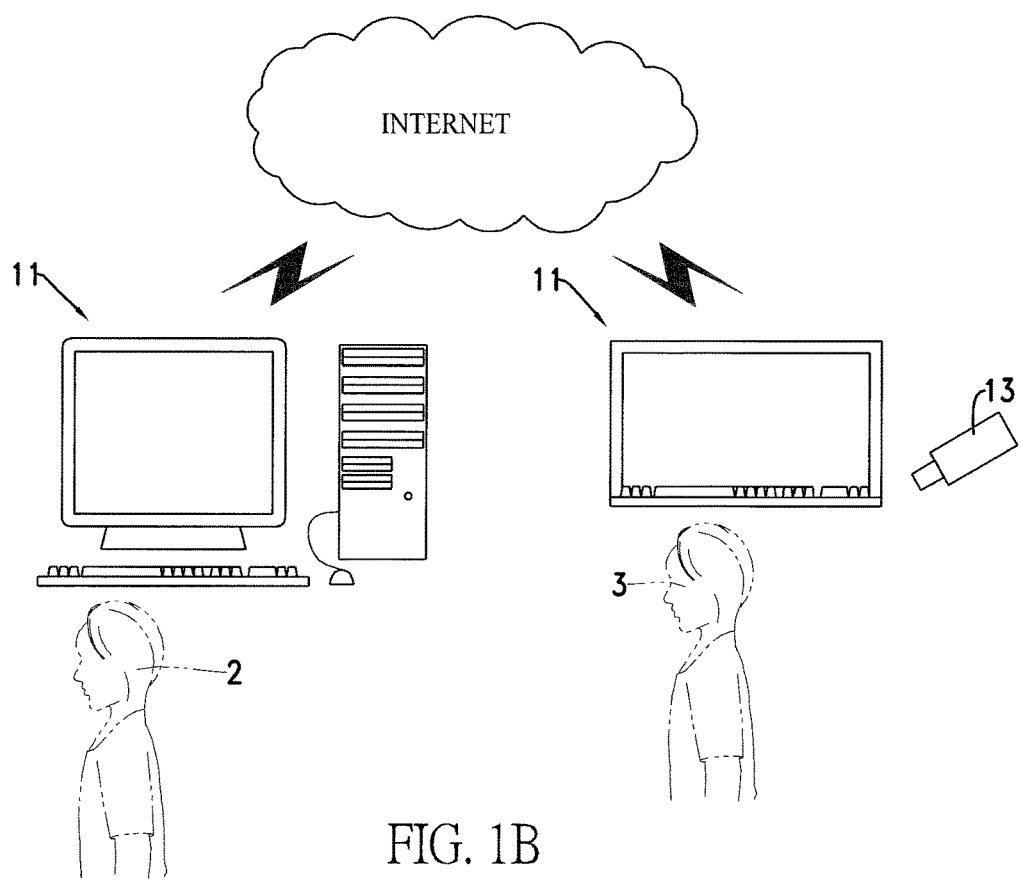

With reference to FIG. 1A and FIG. 1B, FIG. 1A and FIG. 1B are structural views of a control method of a recoverable file protection device in a first embodiment of the present invention. The present invention proposes the recoverable file protection device 11, which can be a laptop or a desktop. A file owner and a user in the present embodiment can operate the control method by implementing the recoverable file protection device.

Specifically, in an organization, different persons have different priorities and responsibilities. Therefore, when the file owner 2 would like to provide the file to the user 3 in accordance with the user's access authorities, the file owner 2 operates the recoverable file protection device 11 and the recoverable file protection device 11 displays the file in accordance with the operation from the file owner 2. The file's format is designed to include a normal data zone and a customized hidden zone so that can handle new usage or various requirements of the application. Unprotected data is stored in the normal data zone.

Thereafter, the file owner 2 opens a file protection program from the recoverable file protection device 11. After opening the file protection program, the file owner 2 sets a secured content in the unprotected data. After the file owner 2 sets the secured content, a secured content protection mode is further selected. The recoverable file protection device 11 moves the secured content to the customized hidden zone in accordance with the secured content protection mode and the unprotected data without the secured content is saved in the normal data zone to form a first protection data. After forming the first protection data, the file owner 2 inputs an authentication key to encrypt the secured content.

Moreover, the file owner 2 transfers the protected file to the user 3 via the Internet or a mobile storage medium. Since the file owner 2 is to secure the file in accordance with the access authority of the user 3, only the first protection data can be accessed when the user 3 receives the file. If the user 3 would like to further access the file, a control signal is transmitted to notify the recoverable file protection device 11 that the user 3 wants to open the secured content saved in the customized hidden zone. When the recoverable file protection device 11 receives the control signal, the recoverable file protection device 11 will request the user 3 to input the identification verifying data. The user 3 can input the identification verifying data via the desktop or the identification verifying data in an identification verifying device is transmitted to the recoverable file protection device 11 when the identification verifying device with the identification verifying data is connected with the recoverable file protection device 11. The identification verifying device can be a Universal Serial Bus (USB) device 13.

After the user 3 inputted the identification verifying data, the recoverable file protection device 11 compares the identification verifying data with the authentication key. When the identification verifying data complies with the authentication key, the recoverable file protection device 11 moves the secure content from the customized hidden zone and the first protection data of the normal data zone to recover the unprotected data. On the contrary, when the authentication key inputted by the user 3 does not comply with the identification verifying key, the recoverable file protection device 11 displays the first protection data to the user 3, who failed to pass the identification verifying procedure.

Furthermore, after the file owner 2 sets the secured content at the unprotected data in the recoverable file protection device 11 of the aforementioned embodiment, the secured content protection mode is set. And the secured content is moved to the customized hidden zone according to the secured content protection mode. After moving the secured content, a marked content is inserted in the position of the secured content of the unprotected data so that the unprotected data includes the marked content. Further, the unprotected data including the marked content is saved in the normal data zone to form the first protection data.

Also, after setting the secured content protection mode, the recoverable file protection device 11 duplicates the secured content to generate another secured content in accordance with the secured content protection mode. Then, the duplicated secured content is moved to the customized hidden zone. After the duplicated secured content is moved, the marked content replaces the secured content in the unprotected data so that the unprotected data includes the marked content. Further, the unprotected data including the marked content is saved in the normal data zone to form the first protection data.

Figure 2:
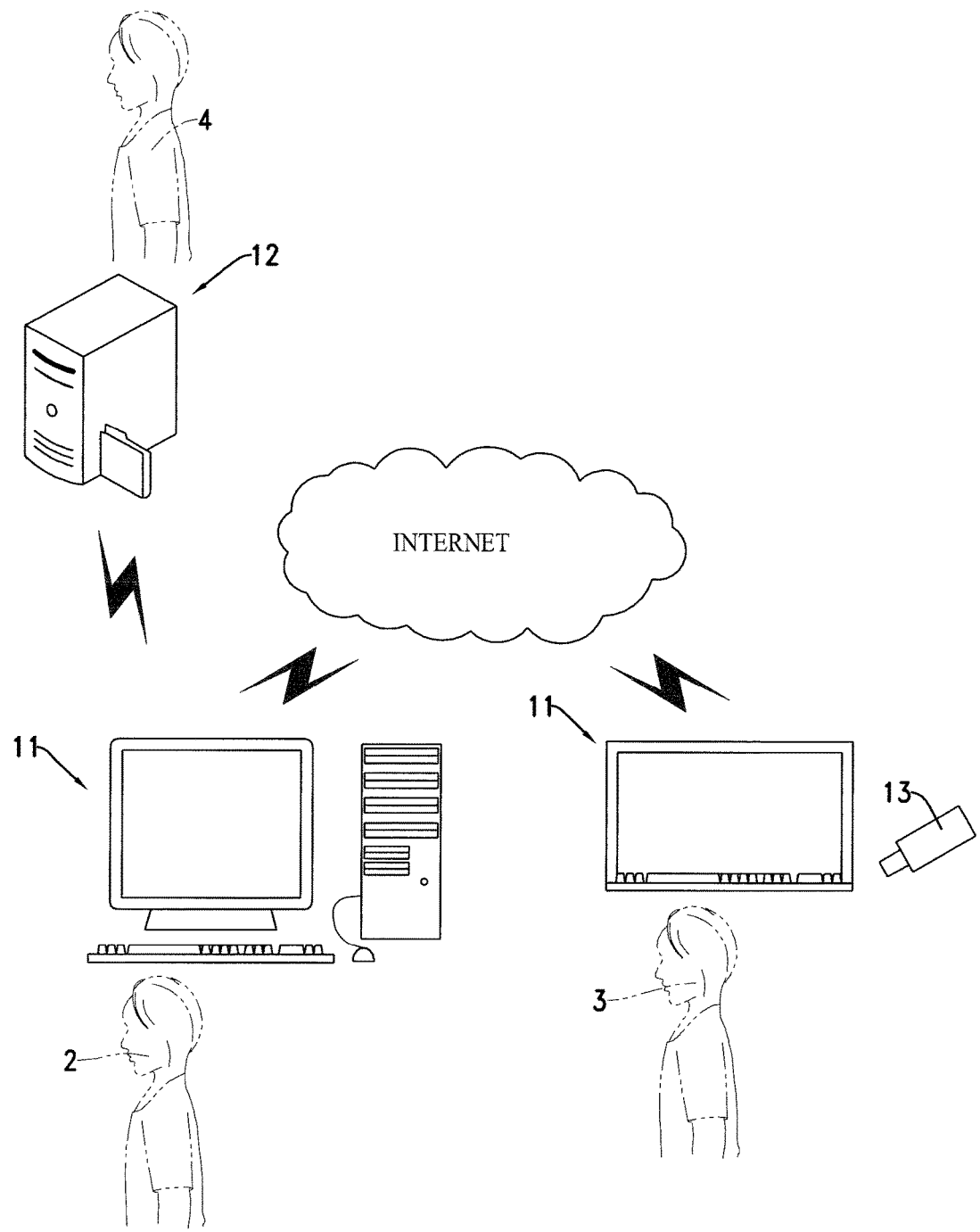
FIG. 2 is a structural view in a second embodiment of the control method the present invention.

With reference to FIG. 2, FIG. 2 is a structural view of a second embodiment of the present invention. First of all, the file owner 2 operates the recoverable file protection device 11 to receive a file sharing protection rule created by the administrator 4 from the server 12. The file sharing protection rule includes a file secured content and a file secured content protection mode, and the file sharing protection rule is saved in the recoverable file protection device 11. In an organization, different persons have different responsibilities and priorities. Therefore, when the file owner 2 would like to provide the file to the user 3 in accordance with the user's access authorities, the file owner 2 operates the recoverable file protection device 11 and the recoverable file protection device 11 displays the file in accordance with the operation from the file owner 2. The file's format is designed to include a normal data zone and a customized hidden zone so that can handle new usage or various requirements of the application. Unprotected data is stored in the normal data zone.

Thereafter, the file owner 2 opens a file protection program from the recoverable file protection device 11. After opening the file protection program, the file owner 2 sets a secured content in the unprotected data. After the file owner 2 sets the secured content, a secured content protection mode is further selected. And then the recoverable file protection device 11 moves the secured content to the customized hidden zone in accordance with the secured content protection mode. Thereafter, the unprotected data without the secured content replaces the unprotected data and saves in the normal data zone to form a first protection data. The file owner 2 establishes the file sharing protection rule and the recoverable file protection device 11 sets up the file secured content at the first protection data in accordance with the file secured content of the file sharing protection rule. Then, the recoverable file protection device 11 moves the file secured content to the customized hidden zone in accordance with the file secured content protection mode (the customized hidden zone includes the secured content and file secured content at this moment), and the first protection data without the file secured content replaces the first protection data saving in the normal data zone to form a second protection data. After forming the second protection data, the file owner 2 inputs the authentication key via the recoverable file protection device 11 to encrypt the file secured content and the secured content.

Furthermore, the aforementioned embodiment can also be used to set the file secured content protection mode. The recoverable file protection device 11 moves the file secured content to the customized hidden zone in accordance with the file secured content protection mode. After the file secured content is moved out, the marked content is inserted in a position of the file secured content so that the first protection data includes the marked content. Further, the first protection data including the marked content is saved in the normal data zone to form the second protection data.

Also, after setting the file secured content protection mode, the recoverable file protection device 11 duplicates the file secured content to generate another file secured content. Then, the duplicated file secured content is moved to the customized hidden zone. After the duplicated file secured content is moved, the marked content replaces the file secured content of the first protection data so that the first protection data includes the marked content. Further, the first protection data including the marked content is saved in the normal data zone to form the second protection data.

Moreover, the file owner 2 transfers the file (the second protection data, the secured content and the file secured content) to the user 3 via the Internet or the mobile storage medium. The file owner 2 and an administrator 4 set the secured content and the file secured content in the unprotected data according to the access authority of the user 3. After setting the secured content and the file secured content, the second protection data is generated. When the user 3 receives the file, only the second protection data can be accessed. If the user 3 would like to further access the file, the control signal is transmitted to notify the recoverable file protection device 11 to open the unprotected data. When the recoverable file protection device 11 receives the control signal, the recoverable file protection device 11 will ask the user 3 to input the identification verifying data.

After the user 3 inputs the identification verifying data, the recoverable file protection device 11 compares the identification verifying data with the authentication key. When the identification verifying data complies with the authentication key, the recoverable file protection device 11 moves the secured content and the file secured content from the customized hidden zone and the second protection data from the normal data zone to recover the unprotected data by the file protection program. On the contrary, if the identification verifying data inputted by the user 3 does not comply with the authentication key, the recoverable file protection device 11 displays the second protection data to the user 3 to access.

Furthermore, the recoverable file protection device 11 in the aforementioned first embodiment or second embodiment can create a file managing rule by the file owner 2 after forming the first protection data or the second protection data. The recoverable file protection device 11 forbids file printing, file duplicating and file editing, sets file usage expiration date, sets file usage frequency and time, displays watermark in the file or adds texts automatically in the file.

Figure 3:
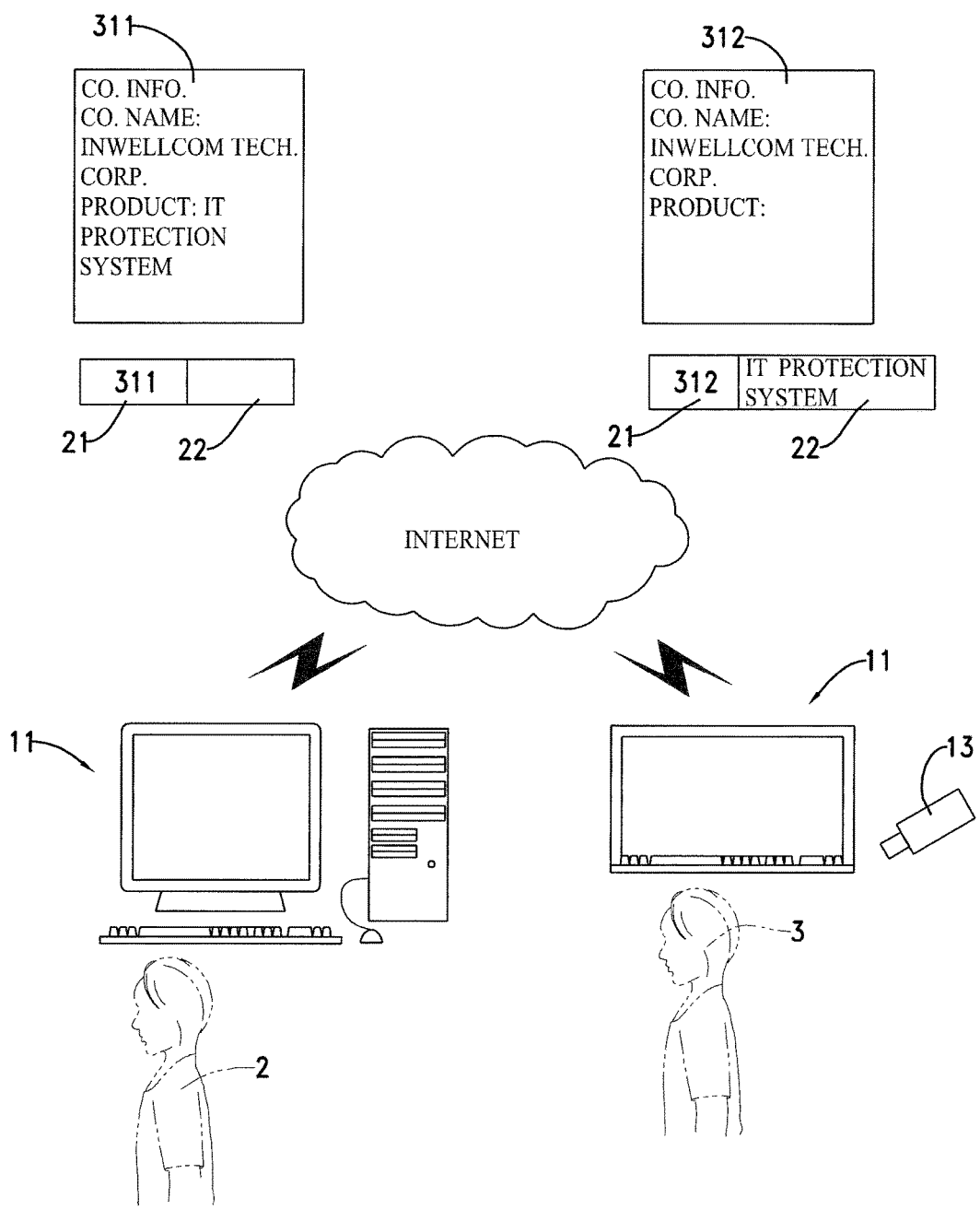
FIG. 3 is a view of an example in the first embodiment of the control method of the present invention.

For example, with reference to FIG. 3, FIG. 3 is a view of an example in the first embodiment of the present invention. The file owner 2 operates the recoverable file protection device 11 and the recoverable file protection device 11 displays the file in accordance with the operation from the file owner 2. The file's format is designed to include a normal data zone 21 and a customized hidden zone 22 so that can handle new usage or various requirements of the application. Unprotected data 311 is stored in the normal data zone 21.

Thereafter, the file owner 2 opens a file protection program via the recoverable file protection device 11. After opening the file protection program, the file owner 2 sets a secured content (such as "IT protection system") in the unprotected data 311. After the file owner 2 sets the secured content ("IT protection system"), a secured content protection mode (such as a hidden mode) is further selected. The recoverable file protection device 11 moves the secured content ("IT protection system") to the customized hidden zone 22 in accordance with the secured content protection mode (the hidden mode), and the unprotected data 311 without the secured content ("IT protection system") replaces the unprotected data 311 to form a first protection data 312. After forming the first protection data 312, the file owner 2 inputs an authentication key to encrypt the secured content ("IT protection system").

Moreover, the file owner 2 transfers the protected file to the user 3 via the Internet or a mobile storage medium. Since the file owner 2 secures the file in accordance with the access authority of the user 3, only the first protection data 312 can be accessed when the user 3 receives the file. If the user 3 would like to further access the file, a control signal is transmitted to notify the recoverable file protection device 11 to open the unprotected data 311. When the recoverable file protection device 11 receives the control signal, the recoverable file protection device 11 will ask the user 3 to input the identification verifying data.

After the user 3 inputs the identification verifying data, the recoverable file protection device 11 compares the identification verifying data with the authentication key. When the identification verifying data complies with the authentication key, the recoverable file protection device 11 moves the secured content ("IT protection system") from the customized hidden zone 22 and the first protection data from the normal data zone 21 to recover the unprotected data 311 via the file protection program. On the contrary, after the user 3 inputs the identification verification data, the recoverable file protection device 11 compares the identification verifying data with the authentication key. If the identification verifying data doesn't comply with the authentication key, the recoverable file protection device 11 displays the first protection data 312.

Figure 4:
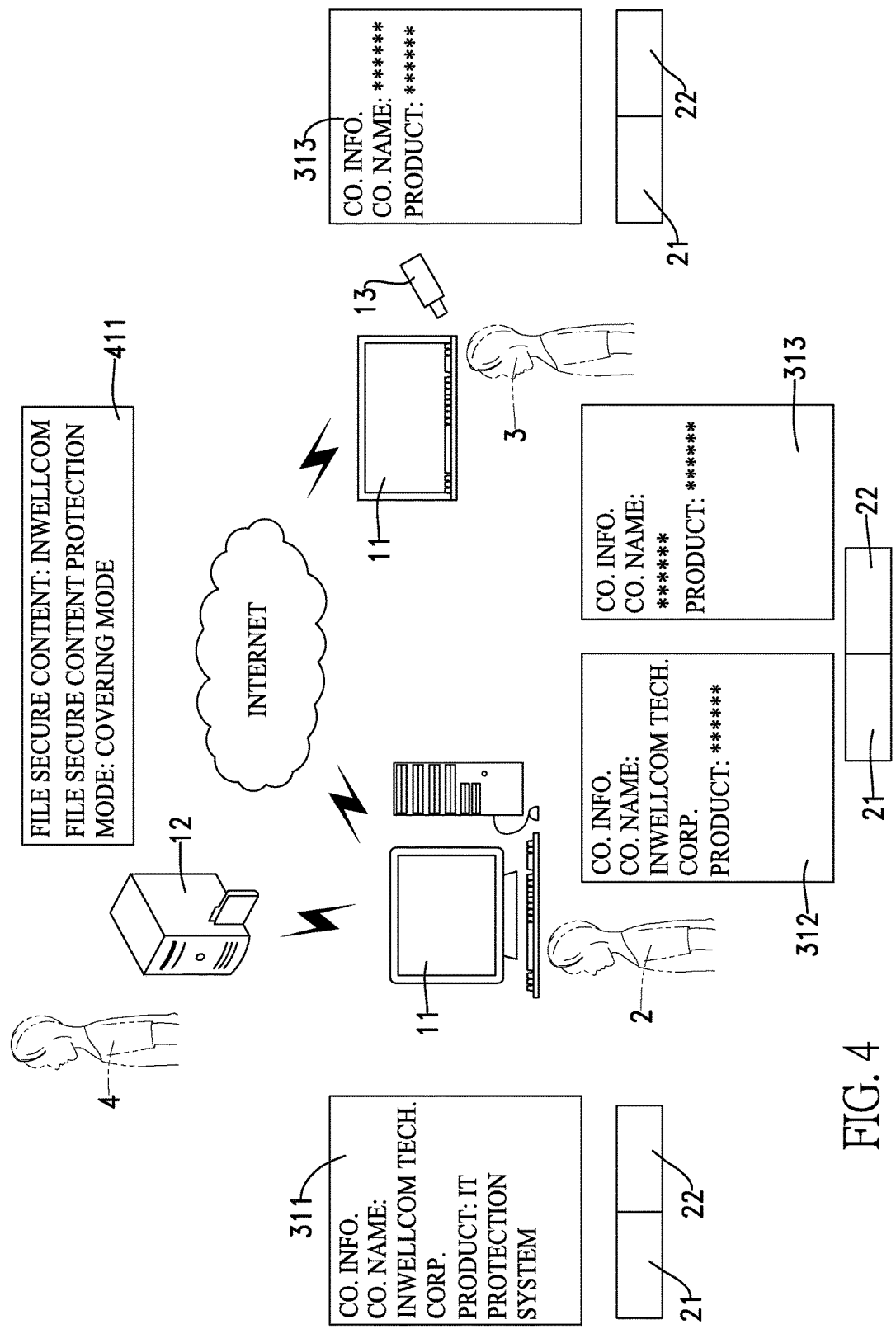
FIG. 4 is a view of an example in the second embodiment of the control method the present invention.

In another example, with reference to FIG. 4, FIG. 4 is a view of the example in the second embodiment of the present invention. After the recoverable file protection device 11 is connected with the server 12 and the administrator 4 creates the file sharing protection rule 411 by the server 12, the file sharing protection rule 411 is transmitted to the recoverable file protection device 11 to be saved. The file sharing protection rule 411 includes a file secured content and a file secured content protection mode. The file owner 2 operates the recoverable file protection device 11 and the recoverable file protection device 11 displays the file in accordance with the operation from the file owner 2. The file's format is designed to include a normal data zone 21 and a customized hidden zone 22 so that can handle new usage or various requirements of the application. Unprotected data 311 is stored in the normal data zone 21.

Thereafter, the file owner 2 opens a file protection program from the recoverable file protection device 11. After opening the file protection program, the file owner 2 sets a secured content (such as "IT protection system") in the unprotected data 311. After the file owner 2 sets the secured content ("IT protection system"), a secured content protection mode (such as a covering mode) is further selected. The recoverable file protection device 11 moves the secured content ("IT protection system") to the customized hidden zone 22 in accordance with the secured content protection mode (the covering mode), and the secured content ("IT protection system") of the unprotected data 311 is replaced by the marked content (such as "*"). After the marked content (such as "*") replaced the secured content ("IT protection system") of the unprotected data 311, the replaced unprotected data is saved in the normal data zone 21 to replace the unprotected data 311 so that forms the first protection data 312. In addition, the file owner 2 selects the file sharing protection rule 411 and the recoverable file protection device 11 sets the file secured content (such as "Inwellcom") at the first protection data 312 in accordance with the file secured content ("Inwellcom") of the file sharing protection rule 411.

Thereafter, after setting the file secured content ("Inwellcom"), the recoverable file protection device 11 moves the file secured content ("Inwellcom") to the customized hidden zone 22 in accordance with the file secured content protection mode (the covering mode)(the customized hidden zone 22 includes the secured content "IT protection system" and "Inwellcom" at this moment). The marked content (such as "*") replaces the file secured content ("Inwellcom") of the first protection data so that the first protection data includes the marked content (such as "*"). Further, the first protection data including the marked content (such as "*") is saved in the normal data zone 21 to form a second protection data 313. After forming the second protection data 313, the file owner 2 inputs the authentication key to encrypt the file secured content ("Inwellcom") and the secured content ("IT protection system").

Furthermore, the file owner 2 transfers the protected file to the user 3 via the Internet or the mobile storage medium. When the user 3 receives the file, only the second protection data 313 can be accessed. If the user 3 would like to further access the file, the control signal is transmitted to notify the recoverable file protection device 11 to open the unprotected data 311. When the recoverable file protection device 11 receives the control signal, the recoverable file protection device 11 will ask the user 3 to input the identification verifying data.

After the user 3 inputs the identification verifying data, the recoverable file protection device 11 compares the identification verifying data with the authentication key. When the identification verifying data complies with the authentication key, the recoverable file protection device 11 moves the file secured content ("Inwellcom") and the secured content ("IT protection system") from the customized hidden zone 22 and the second protection data 313 from the normal data zone 21 to recover the unprotected data 311 via the file protection program. On the contrary, after the user 3 inputs the identification verification data, the recoverable file protection device 11 compares the identification verifying data with the authentication key. If the identification verifying data does not comply with the authentication key, the recoverable file protection device 11 displays the second protection data 313.

Figure 5:
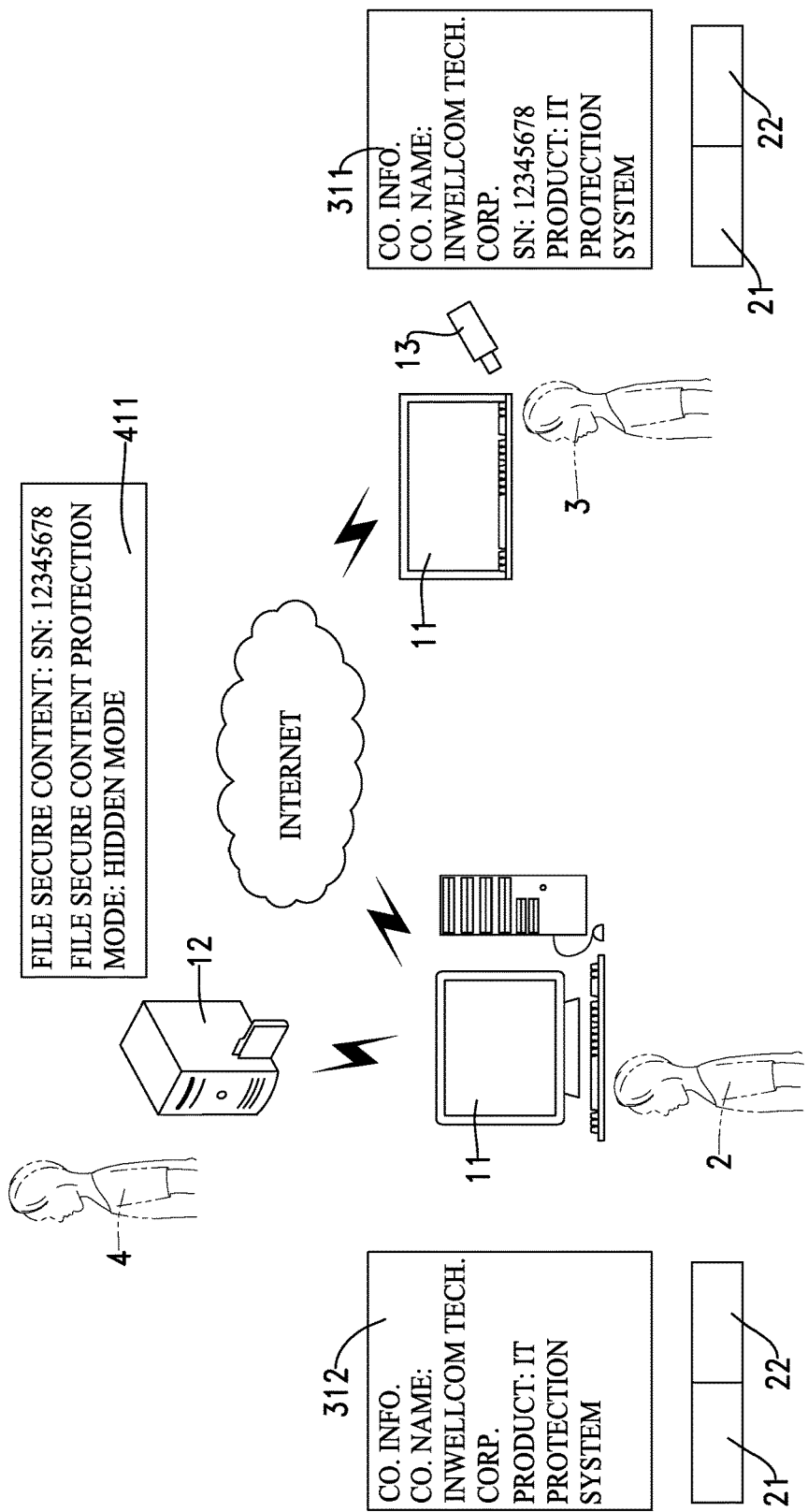
FIG. 5 is a view of a third embodiment of the control method of the present invention.

Furthermore, with reference to FIG. 5, FIG. 5 is a view of a third embodiment of the present invention. After the recoverable file protection device 11 is connected with the server 12 and the server 12 receives the file sharing protection rule 411 created by the administrator 4, the file sharing protection rule 411 is saved in the recoverable file protection device 11. At first, the file owner 2 operates the recoverable file protection device 11 and the recoverable file protection device 11 displays the file in accordance with the operation from the file owner 2. The file's format is designed to include a normal data zone 21 and a customized hidden zone 22 so that can handle new usage or various requirements of the application. Unprotected data 311 is stored in the normal data zone 21.

Thereafter, the file owner 2 opens a file protection program from the recoverable file protection device 11. After opening the file protection program, the file owner 2 chooses the file sharing protection rule 411. After choosing the file sharing protection rule 411, the recoverable file protection device 11 sets a file secured content (such as "SN: 12345678") and a file secured content protection mode (such as the hidden mode). The recoverable file protection device 11 moves the file secured content ("SN: 12345678") to the customized hidden zone 22 and the unprotected data 311 without the file secured content is saved in the normal data zone 21 to form a first protection data 312. After forming the first protection data 312, the file owner 2 inputs the authentication key via the recoverable file protection device 11 to encrypt the file secured content.

Furthermore, after the aforementioned embodiment sets the file secured content protection mode, the recoverable file protection device 11 moves the file secured content to the customized hidden zone in accordance with the file secured content protection mode. After moving the file secured content, the marked content is inserted in the position of the file secured content of the unprotected data 311 so that the unprotected data 311 includes the marked content. Further, the unprotected data 311 including the marked content is saved in the normal data zone 21 to form the first protection data.

Also, after setting the file secured content protection mode, the recoverable file protection device 11 duplicates the file secured content in accordance with the file secured content protection mode to form another file secured content. Thereafter, the duplicated file secured content is moved to the customized hidden zone 22. After moving the duplicated file secured content to the customized hidden zone 22, the marked content replaces the file secured content so that the unprotected data includes the marked content. Further, the unprotected data including the marked content is saved in the normal data zone 21 to form the first protection data.

Moreover, the file owner 2 transfers the protected file to the user 3 via the Internet or a mobile storage medium. Since the file owner 2 protects the unprotected data 311 to form the first protection data 312 in accordance with the access authority of the user 3, only the first protection data can be accessed when the user 3 receives the file. If the user 3 would like to further access the file, the control signal is transmitted to notify the recoverable file protection device 11 to open the unprotected data 311. When the recoverable file protection device 11 receives the control signal, the recoverable file protection device 11 will ask the user 3 to input the identification verifying data.

After the user 3 inputs the identification verifying data, the recoverable file protection device 11 compares the identification verifying data with the authentication key. When the identification verifying data complies with the authentication key, the recoverable file protection device 11 moves the file secured content from the customized hidden zone and the first protection data 312 from the normal data zone to recover the unprotected data 311 by the file 2 protection program. On the contrary, if the identification verifying data inputted by the user 3 does not comply with the authentication key, the recoverable file protection device 11 displays the first protection data 312.

In the aforementioned embodiment, after the recoverable file protection device 11 moves the file secured content to the customized hidden zone, the marked content replaces the file secured content of the unprotected data so that the unprotected data includes the marked content. Further, the unprotected data including the marked content is saved in the normal data zone to form the first protection data.

Figure 6:
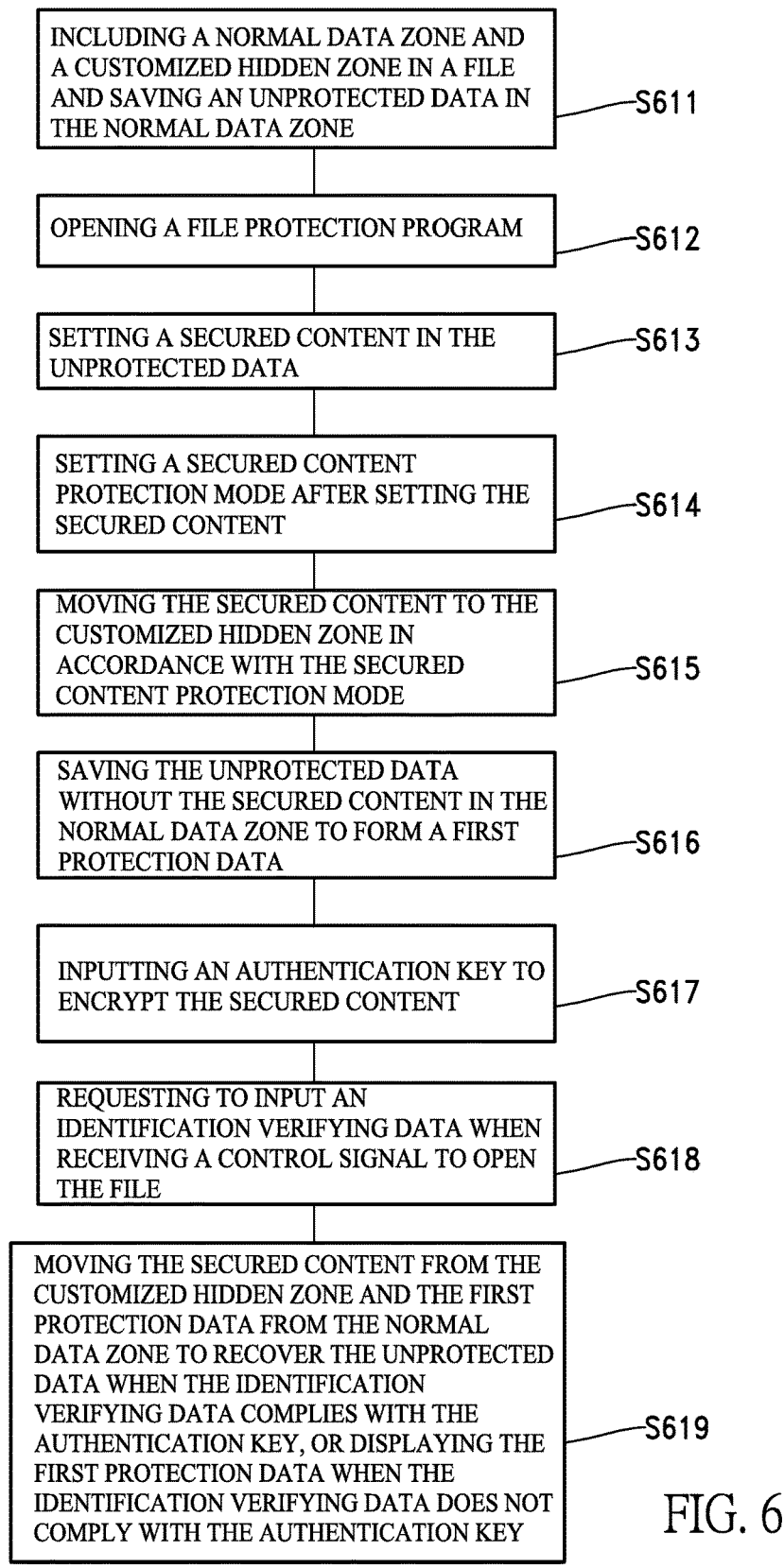
FIG. 6 is a flow chart of the recoverable file protection method.

In addition, the recoverable file protection method in the present invention is shown in FIG. 6. FIG. 6 is a flow chart of the recoverable file protection method and includes the following steps:

including a normal data zone and a customized hidden zone in a file and saving an unprotected data in the normal data zone (S611);

opening a file protection program (S612);

setting a secured content in the unprotected data (S613);

setting a secured content protection mode after setting the secured content (S614);

moving the secured content to the customized hidden zone in accordance with the secured content protection mode (S615);

saving the unprotected data without the secured content in the normal data zone to form a first protection data (S616);

inputting an authentication key to encrypt the secured content (S617);

requesting to input an identification verifying data when receiving a control signal to open the file (S618);

moving the secured content from the customized hidden zone and the first protection data from the normal data zone to recover the unprotected data when the identification verifying data complies with the authentication key, or displaying the first protection data when the identification verifying data does not comply with the authentication key (S619).

Figure 7:
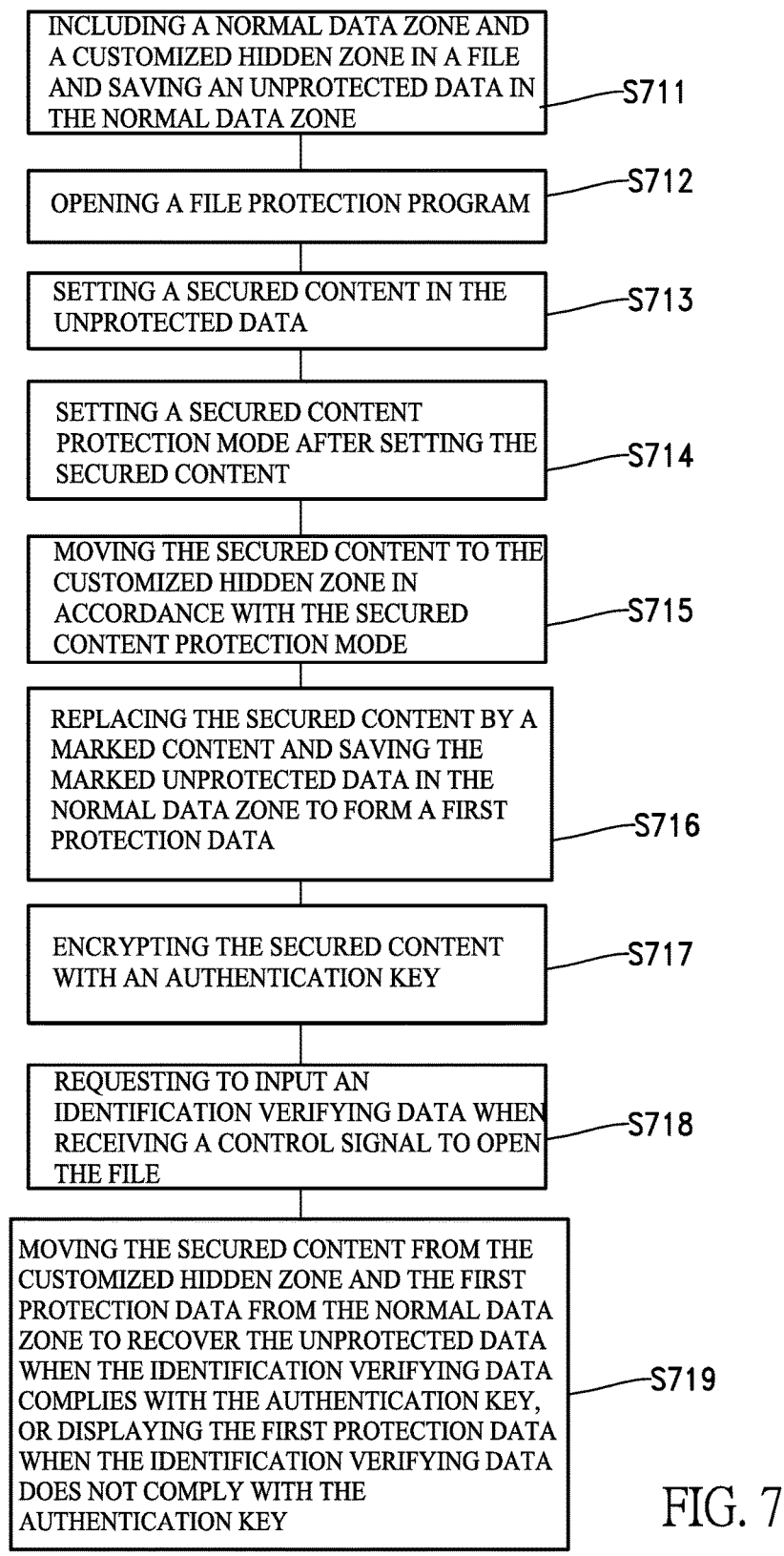
FIG. 7 is another flow chart of the protection method of the recoverable file.

In addition, with reference to FIG. 7, FIG. 7 is another flow chart of a protection method of the recoverable file and includes the following steps:

including a normal data zone and a customized hidden zone in a file and saving an unprotected data in the normal data zone (S711);

opening a file protection program (S712);

setting a secured content in the unprotected data (S713);

setting a secured content protection mode after setting the secured content (S714);

moving the secured content to the customized hidden zone in accordance with the secured content protection mode (S715);

replacing the secured content by a marked content and saving the marked unprotected data in the normal data zone to form a first protection data (S716);

encrypting the secured content with an authentication key (S717);

requesting to input an identification verifying data when receiving a control signal to open the file (S718);

moving the secured content from the customized hidden zone and the first protection data from the normal data zone to recover the unprotected data when the identification verifying data complies with the authentication key, or displaying the first protection data when the identification verifying data does not comply with the authentication key (S719).

Figure 8:
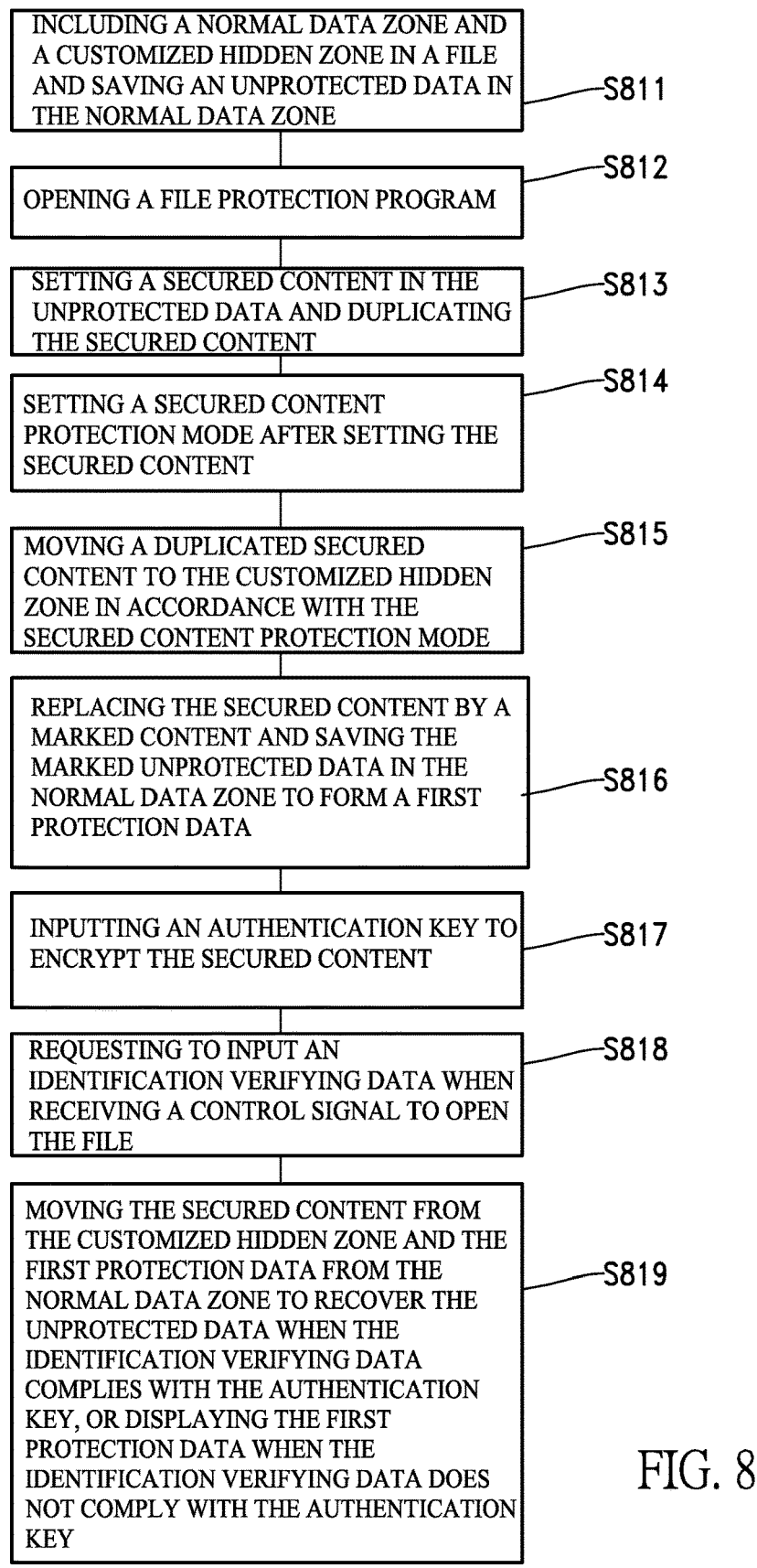
FIG. 8 is still another flow chart of the protection method of the recoverable file.

In addition, with reference to FIG. 8, FIG. 8 is still another flow chart of a protection method of the recoverable file and includes the following steps:

including a normal data zone and a customized hidden zone in a file and saving an unprotected data in the normal data zone (S811);

opening a file protection program (S812);

setting a secured content in the unprotected data and duplicating the secured content (S813);

setting a secured content protection mode after setting the secured content (S814);

moving a duplicated secured content to the customized hidden zone in accordance with the secured content protection mode (S815);

replacing the secured content by a marked content and saving the marked unprotected data in the normal data zone to form a first protection data (S816);

inputting an authentication key to encrypt the secured content (S817);

requesting to input an identification verifying data when receiving a control signal to open the file (S818);

moving the secured content from the customized hidden zone and the first protection data from the normal data zone to recover the unprotected data when the identification verifying data complies with the authentication key, or displaying the first protection data when the identification verifying data does not comply with the authentication key (S819).

Figure 9:
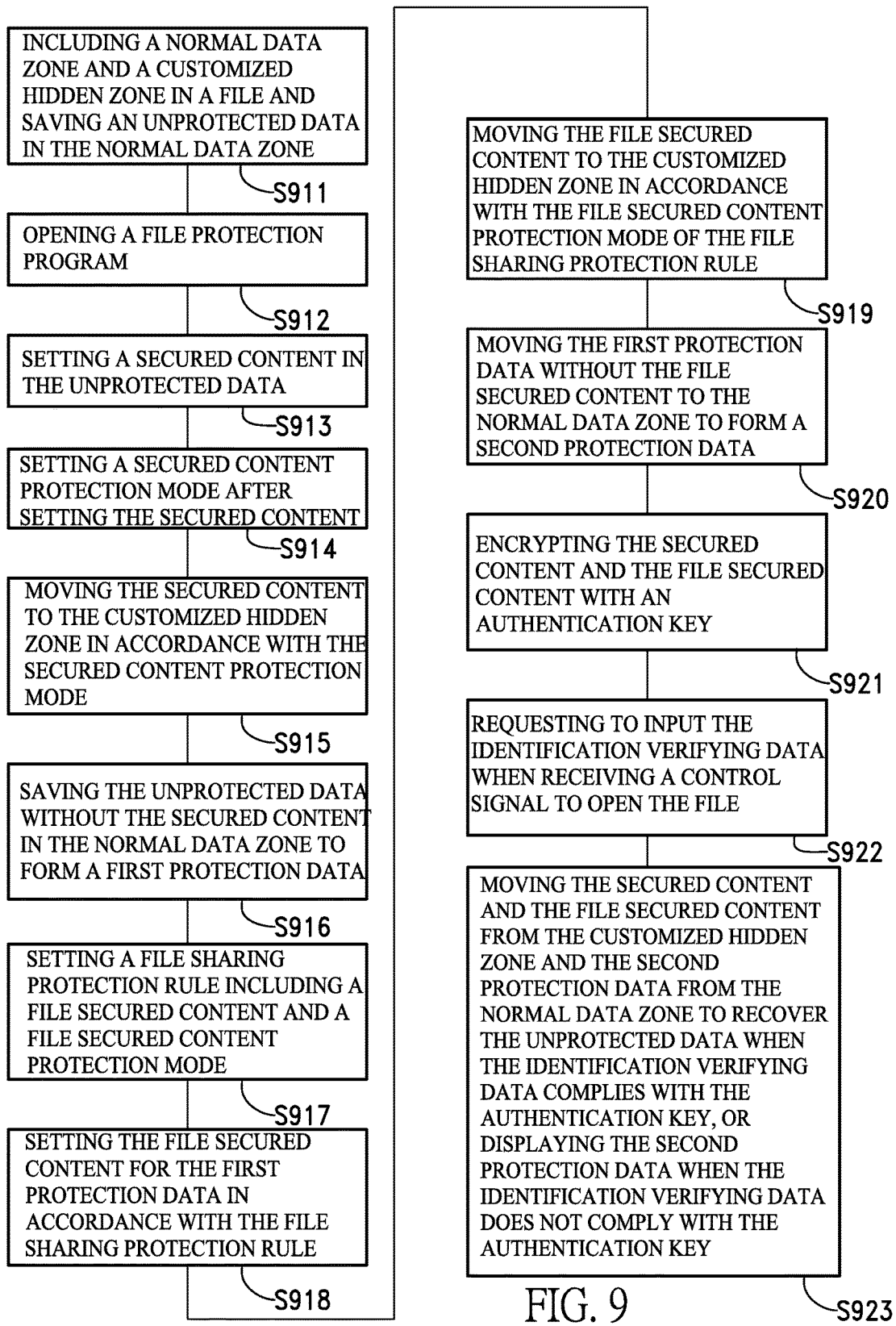
FIG. 9 is a flow chart of a protection method of the recoverable file in the second embodiment of the present invention.

In addition, with reference to FIG. 9, FIG. 9 is a flow chart of a protection method of the recoverable file in the second embodiment of the present invention and includes the following steps:

including a normal data zone and a customized hidden zone in a file and saving an unprotected data in the normal data zone (S911);

opening a file protection program (S912);

setting a secured content in the unprotected data (S913);

setting a secured content protection mode after setting the secured content (S914);

moving the secured content to the customized hidden zone in accordance with the secured content protection mode (S915);

saving the unprotected data without the secured content in the normal data zone to form a first protection data (S916);

setting a file sharing protection rule including a file secured content and a file secured content protection mode (S917);

setting the file secured content for the first protection data in accordance with the file sharing protection rule (S918);

moving the file secured content to the customized hidden zone in accordance with the file secured content protection mode of the file sharing protection rule (S919);

moving the first protection data without the file secured content to the normal data zone to form a second protection data (S920);

encrypting the secured content and the file secured content with an authentication key (S921);

requesting to input the identification verifying data when receiving a control signal to open the file (S922);

moving the secured content and the file secured content from the customized hidden zone and the second protection data from the normal data zone to recover the unprotected data when the identification verifying data complies with the authentication key, or displaying the second protection data when the identification verifying data does not comply with the authentication key (S923).

Figure 10:
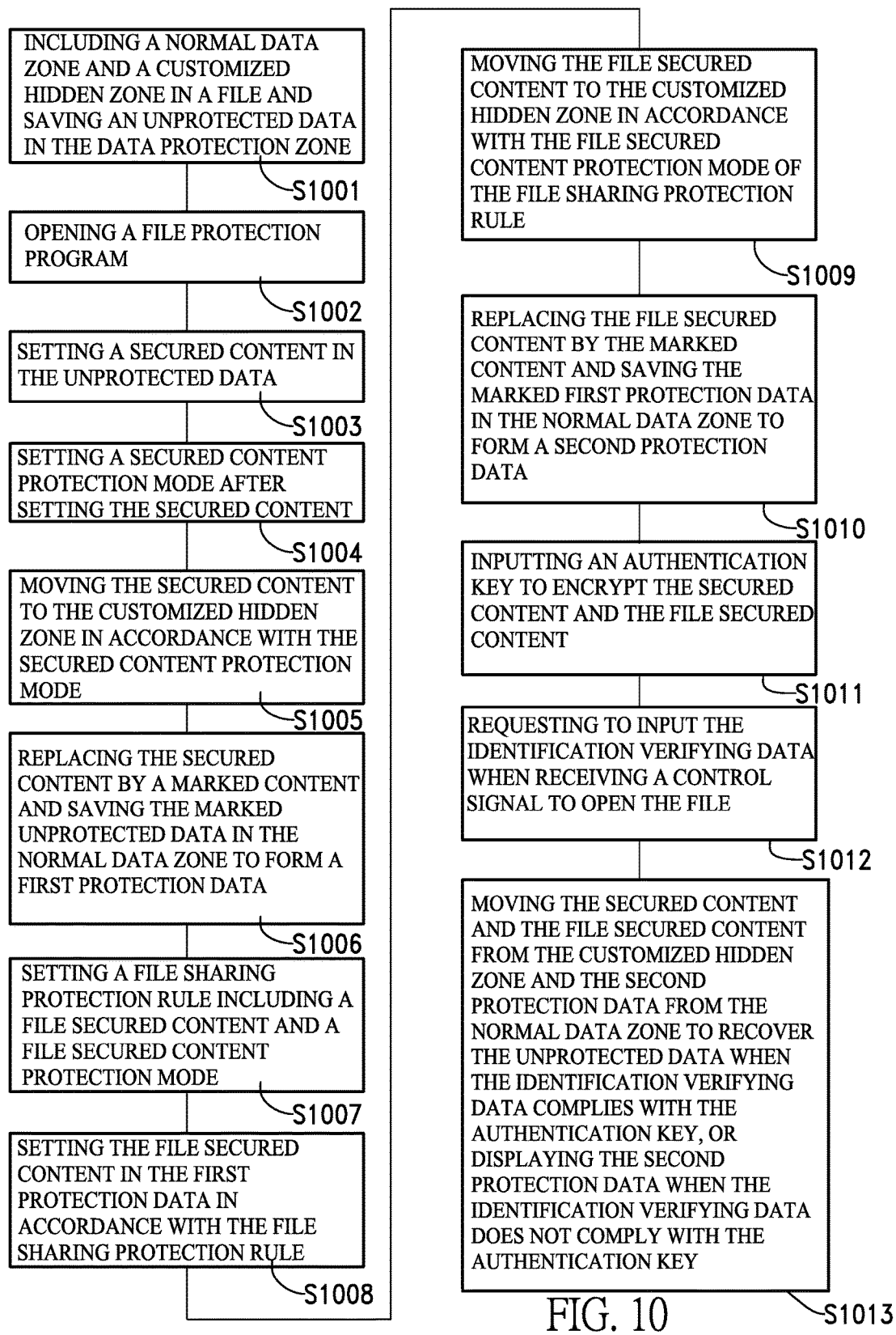
FIG. 10 is another flow chart of the protection method of the recoverable file in the second embodiment of the present invention.

In addition, with reference to FIG. 10, FIG. 10 is another flow chart of a protection method of the recoverable file in the second embodiment of the present invention and includes the following steps:

including a normal data zone and a customized hidden zone in a file and saving an unprotected data in the normal data zone (S1001);

opening a file protection program (S1002);

setting a secured content in the unprotected data (S1003);

setting a secured content protection mode after setting the secured content (S1004);

moving the secured content to the customized hidden zone in accordance with the secured content protection mode (S1005);

replacing the secured content by a marked content and saving the marked unprotected data in the normal data zone to form a first protection data (S1006);

setting a file sharing protection rule including a file secured content and a file secured content protection mode (S1007);

setting the file secured content in the first protection data in accordance with the file sharing protection rule (S1008);

moving the file secured content to the customized hidden zone in accordance with the file secured content protection mode of the file sharing protection rule (S1009);

replacing the file secured content by the marked content and saving the marked first protection data in the normal data zone to form a second protection data (S1010);

inputting an authentication key to encrypt the secured content and the file secured content (S1011);

requesting to input the identification verifying data when receiving a control signal to open the file (S1012);

moving the secured content and the file secured content from the customized hidden zone and the second protection data from the normal data zone to recover the unprotected data when the identification verifying data complies with the authentication key, or displaying the second protection data when the identification verifying data does not comply with the authentication key (S1013).

Figure 11:
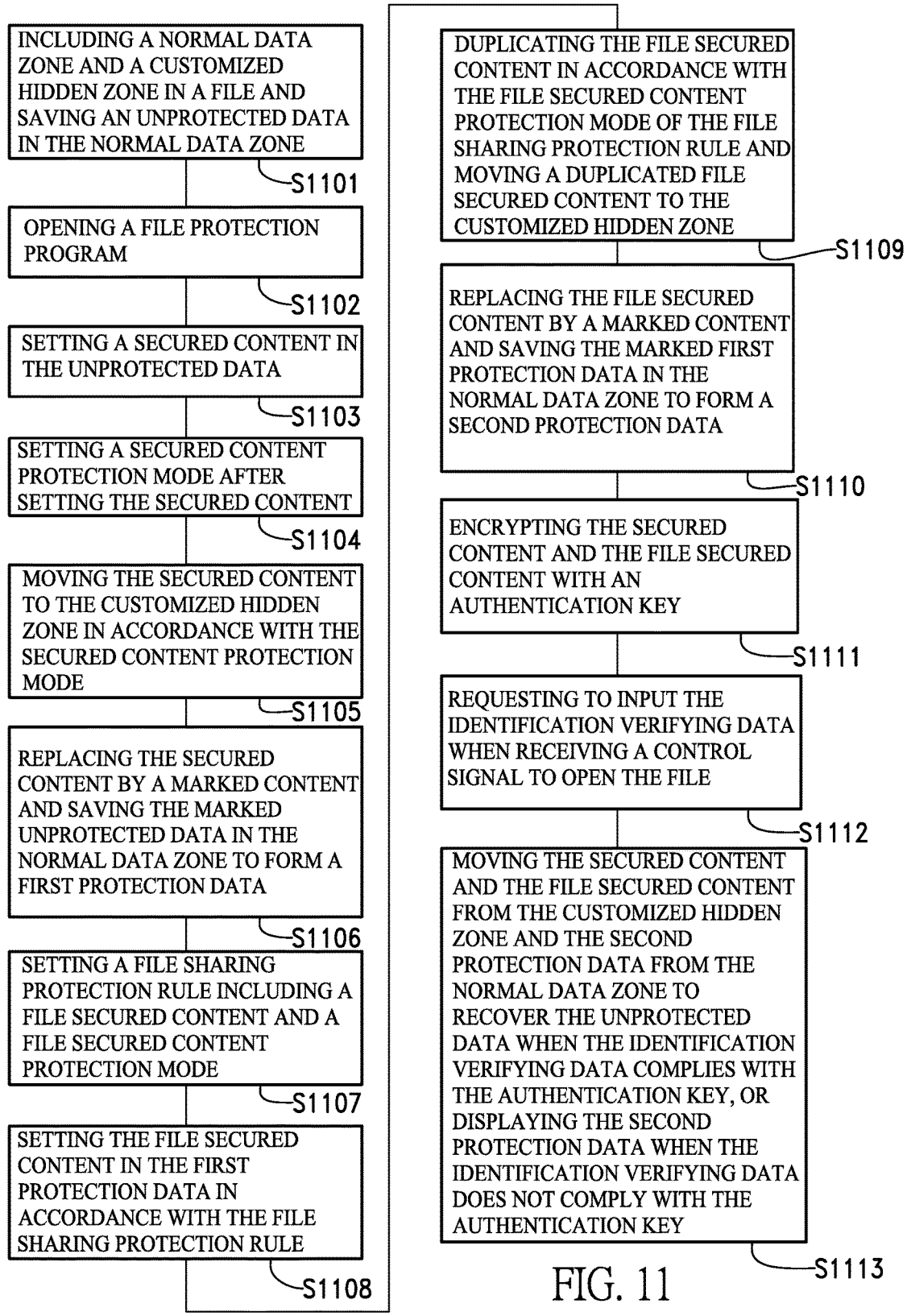
FIG. 11 is still another flow chart of the protection method of the recoverable file in the second embodiment of the present invention.

In addition, with reference to FIG. 11, FIG. 11 is still another flow chart of a protection method of the recoverable file in the second embodiment of the present invention and includes the following steps:

including a normal data zone and a customized hidden zone in a file and saving an unprotected data in the normal data zone (S1101);

opening a file protection program (S1102);

setting a secured content in the unprotected data (S1103);

setting a secured content protection mode after setting the secured content (S1104);

moving the secured content to the customized hidden zone in accordance with the secured content protection mode (S1105);

replacing the secured content by a marked content and saving the marked unprotected data in the normal data zone to form a first protection data (S1106);

setting a file sharing protection rule including a file secured content and a file secured content protection mode (S1107);

setting the file secured content in the first protection data in accordance with the file sharing protection rule (S1108);

duplicating the file secured content in accordance with the file secured content protection mode of the file sharing protection rule and moving a duplicated file secured content to the customized hidden zone (S1109);

replacing the file secured content by a marked content and saving the marked first protection data in the normal data zone to form a second protection data (S1110);

encrypting the secured content and the file secured content with an authentication key (S1111);

requesting to input the identification verifying data when receiving a control signal to open the file (S1112);

moving the secured content and the file secured content from the customized hidden zone and the second protection data from the normal data zone to recover the unprotected data when the identification verifying data complies with the authentication key, or displaying the second protection data when the identification verifying data does not comply with the authentication key (S1113).

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A control method of a recoverable file protection device, comprising steps of:
    displaying a file including a normal data zone and a customized hidden zone by the recoverable file protection device, and storing an unprotected data in the normal data zone;
    opening a file protection program via the recoverable file protection device by a file owner;
    setting a secured content in the unprotected data by the file owner after opening the file protection program via the recoverable file protection device;
    setting a secured content protection mode after setting the secured content via the recoverable file protection device;
    moving the secured content to the customized hidden zone in accordance with the secured content protection mode by the recoverable file protection device;
    saving the unprotected data without the secured content in the normal data zone to form a first protection data by the recoverable file protection device;
    encrypting the secured content with an authentication key inputted by the file owner via the recoverable file protection device;
    requesting a user to input an identification verifying data when the recoverable file protection device receives a control signal to open the file; and
    comparing the identification verifying data with the authentication key by the recoverable file protection device;
    moving the secured content from the customized hidden zone and the first protection data from the normal data zone to recover the unprotected data via the file protection program in the recoverable file protection device when the identification verifying data complies with the authentication key; and
    displaying the first protection data by the recoverable file protection device when the identification verifying data does not comply with the authentication key;
    setting a file sharing protection rule including a file secured content and a file secured content protection mode by the recoverable file protection device;
    setting the file secured content in the first protection data in accordance with the file sharing protection rule by the recoverable file protection device;
    moving the file secured content of the first protection data to the customized hidden zone in accordance with the file secured content protection mode of the file sharing protection rule; and
    saving the first protection data without the file secured content in the normal data zone to form a second protection data.

2. The control method of the recoverable file protection device as claimed in claim 1, further comprising a step of:
    duplicating the secured content and moving the duplicated secured content to the customized hidden zone in accordance with the secured content protection mode by the recoverable file protection device.

3. The control method of the recoverable file protection device as claimed in claim 1, after moving the secured content to the customized hidden zone by the recoverable file protection device further comprising a step of:
    replacing the secured content of the unprotected data with a marked content and saving the marked unprotected data in the normal data zone to form the first protection data.

4. The control method of the recoverable file protection device as claimed in claim 2, after moving the secured content to the customized hidden zone by the recoverable file protection device further comprising a step of:
    replacing the secured content of the unprotected data with a marked content and saving the marked unprotected data in the normal data zone to form the first protection data.

5. The control method of the recoverable file protection device as claimed in claim 1, after forming the first protection data by the recoverable file protection device further comprising steps of:
    encrypting the secured content and the file secured content with the authentication key inputted by the user in the recoverable file protection device;
    requesting the user to input the identification verifying data when the recoverable file protection device receives the control signal to open the file; comparing the identification verifying data with the authentication key by the recoverable file protection device;
    moving the secured content and the file secured content from the customized hidden zone and the second protection data from the normal data zone by the file protection program to recover the unprotected data in the recoverable file protection device when the identification verifying data complies with the authentication key; and
    displaying the second protection data by the recoverable file protection device when the identification verifying data does not comply with the authentication key.

6. The control method of the recoverable file protection device as claimed in claim 5 further comprising a step of:
    duplicating the file secured content and moving the duplicated file secured content to the customized hidden zone after setting the file secured content by the recoverable file protection device.

7. The control method of the recoverable file protection device as claimed in claim 3, after forming the first protection data by the recoverable file protection device further comprising steps of:
setting a file sharing protection rule including a file secured content and a file secured content protection mode by the recoverable file protection device;
setting the file secured content in the first protection data in accordance with the file sharing protection rule by the recoverable file protection device;
moving the file secured content of the first protection data to the customized hidden zone in accordance with the file secured content protection mode of the file sharing protection rule;
saving the first protection data without the file secured content to form a second protection data;
encrypting the secured content and the file secured content with the authentication key inputted by the user in the recoverable file protection device;
requesting the user to input the identification verifying data when the recoverable file protection device receives the control signal to open the file;
comparing the identification verifying data with the authentication key by the recoverable file protection device;
moving the secured content and the file secured content from the customized hidden zone and the second protection data from the normal data zone to recover the unprotected data by the file protection program in the recoverable file protection device when the identification verifying data complies with the authentication key; and
displaying the second protection data by the recoverable file protection device when the identification verifying data does not comply with the authentication key.

8. The control method of the recoverable file protection device as claimed in claim 4, after forming the first protection data by the recoverable file protection device further comprising steps of:
setting a file sharing protection rule including a file secured content and a file secured content protection mode by the recoverable file protection device;
setting the file secured content in the first protection data in accordance with the file sharing protection rule by the recoverable file protection device;
moving the file secured content of the first protection data to the customized hidden zone in accordance with the file secured content protection mode of the file sharing protection rule;
saving the first protection data without the file secured content to form a second protection data;
encrypting the secured content and the file secured content with the authentication key inputted by the user in the recoverable file protection device;
requesting the user to input the identification verifying data when the recoverable file protection device receives the control signal to open the file;
comparing the identification verifying data with the authentication key by the recoverable file protection device;
moving the secured content and the file secured content from the customized hidden zone and the second protection data from the normal data zone to recover the unprotected data by the file protection program in the recoverable file protection device when the identification verifying data complies with the authentication key; and
displaying the second protection data by the recoverable file protection device when the identification verifying data does not comply with the authentication key.

9. The control method of a recoverable file protection device as claimed in claim 6, after the step of moving the file secured content to the customized hidden zone by the recoverable file protection device, further comprising steps of:
replacing the file secured content of the first protection data with a marked content; and
saving the marked first protection data in the normal data zone to form the second protection data.

10. The control method of the recoverable file protection device as claimed in claim 7, after the step of moving the file secured content to the customized hidden zone by the recoverable file protection device, further comprising steps of:
replacing the file secured content of the first protection data with a marked content; and
saving the marked first protection data in the normal data zone to form the second protection data.

11. The control method of the recoverable file protection device as claimed in claim 8, after the step of moving the file secured content to the customized hidden zone by the recoverable file protection device, further comprising steps of:
replacing the file secured content of the first protection data with a marked content; and
saving the marked first protection data in the normal data zone to form the second protection data.

12. The control method of the recoverable file protection device as claimed in claim 1, further comprising steps of:
requesting the user to input the authentication key when the recoverable file protection device receives the control signal to open the file;
connecting a verification device having the identification verifying data with the recoverable file protection device by the user; and
transmitting the identification verifying data to the recoverable file protection device.

13. The control method of the recoverable file protection device as claimed in claim 2, further comprising steps of:
requesting the user to input the authentication key when the recoverable file protection device receives the control signal to open the file;
connecting a verification device having the identification verifying data with the recoverable file protection device by the user; and
transmitting the identification verifying data to the recoverable file protection device.

14. The control method of the recoverable file protection device as claimed in claim 5, further comprising steps of:
requesting the user to input the authentication key when the recoverable file protection device receives the control signal to open the file;
connecting a verification device having the identification verifying data with the recoverable file protection device by the user; and
transmitting the identification verifying data to the recoverable file protection device.

15. The control method of the recoverable file protection device as claimed in claim 6, further comprising steps of:

requesting the user to input the authentication key when the recoverable file protection device receives the control signal to open the file;
connecting a verification device having the identification verifying data with the recoverable file protection device by the user; and
transmitting the identification verifying data to the recoverable file protection device.

16. The control method of the recoverable file protection device as claimed in claim 7, further comprising steps of:
requesting the user to input the authentication key when the recoverable file protection device receives the control signal to open the file;
connecting a verification device having the identification verifying data with the recoverable file protection device by the user; and
transmitting the identification verifying data to the recoverable file protection device.

17. The control method of the recoverable file protection device as claimed in claim 8, further comprising steps of:
requesting the user to input the authentication key when the recoverable file protection device receives the control signal to open the file;
connecting a verification device having the identification verifying data with the recoverable file protection device by the user; and
transmitting the identification verifying data to the recoverable file protection device.

18. The control method of the recoverable file protection device as claimed in claim 9, further comprising steps of:
requesting the user to input the authentication key when the recoverable file protection device receives the control signal to open the file;
connecting a verification device having the identification verifying data with the recoverable file protection device by the user; and
transmitting the identification verifying data to the recoverable file protection device.

19. The control method of the recoverable file protection device as claimed in claim 10, further comprising steps of:
requesting the user to input the authentication key when the recoverable file protection device receives the control signal to open the file;
connecting a verification device having the identification verifying data with the recoverable file protection device by the user; and
transmitting the identification verifying data to the recoverable file protection device.

20. The control method of the recoverable file protection device as claimed in claim 11, further comprising steps of:
requesting the user to input the authentication key when the recoverable file protection device receives the control signal to open the file;
connecting a verification device having the identification verifying data with the recoverable file protection device by the user; and
transmitting the identification verifying data to the recoverable file protection device.

21. A control method of a recoverable file protection device, comprising steps of:
connecting the recoverable file protection device with a server;
receiving a file sharing protection rule including a file secured content and a file secured content protection mode and an authentication key from the server;
displaying a file including a normal data zone and a customized hidden zone by the recoverable file protection device, and the normal data zone saving an unprotected data;
opening a file protection program by a file owner in the recoverable file protection device;
setting the file secured content in accordance with the file sharing protection rule after opening the file protection program in the recoverable file protection device and moving the file secured content to the customized hidden zone in accordance with the file secured content protection mode of the file sharing protection rule;
saving the unprotected data without the file secured content in the normal data zone to form a first protection data by the recoverable file protection device;
encrypting the file secured content with the authentication key by the recoverable file protection device;
requesting a user to input an identification verifying data when the recoverable file protection device receives a control signal;
comparing the identification verifying data with the authentication key by the recoverable file protection device;
moving the file secured content from the customized hidden zone and the first protection data from the normal data zone to recover the unprotected data by the file protection program of the recoverable file protection device when the identification verifying data complies with the authentication key; and
displaying the first protection data by the recoverable file protection device when the identification verifying data does not comply with the authentication key;
setting a file sharing protection rule including a file secured content and a file secured content protection mode by the recoverable file protection device;
setting the file secured content in the first protection data in accordance with the file sharing protection rule by the recoverable file protection device;
moving the file secured content of the first protection data to the customized hidden zone in accordance with the file secured content protection mode of the file sharing protection rule; and
saving the first protection data without the file secured content in the normal data zone to form a second protection data.

22. The control method of the recoverable file protection device as claimed in claim 21, further comprising a step of:
duplicating the file secured content; and
moving the duplicated file secured content to the customized hidden zone after setting the file secured content by the recoverable file protection device.

23. The control method of the recoverable file protection device as claimed in claim 21, further comprising steps of:
replacing the file secured content by a marked content; and
saving the marked unprotected data in the normal data zone to form the first protection data.

24. The control method of the recoverable file protection device as claimed in claim 22, further comprising steps of:
replacing the file secured content by a marked content; and
saving the marked unprotected data in the normal data zone to form the first protection data.

25. A protection method of a recoverable file comprising steps of:

including a normal data zone and a customized hidden zone in a file by a recoverable file protection device and saving an unprotected data in the normal data zone;

opening a file protection program from the recoverable file protection device;

setting a secured content in the unprotected data by the recoverable file protection device;

setting a secured content protection mode after setting the secured content by the recoverable file protection device;

moving the secured content to the customized hidden zone in accordance with the secured content protection mode by the recoverable file protection device;

saving the unprotected data without the secured content in the normal data zone to form a first protection data in the recoverable file protection device;

inputting an authentication key to encrypt the secured content in the recoverable file protection device;

requesting a user to input an identification verifying data when the recoverable file protection device receiving a control signal to open the file;

moving the secured content from the customized hidden zone and the first protection data from the normal data zone to recover the unprotected data when the identification verifying data complies with the authentication key in the recoverable file protection device; and displaying the first protection data when the identification verifying data does not comply with the authentication key in the recoverable file protection device;

setting a file sharing protection rule including a file secured content and a file secured content protection mode by the recoverable file protection device;

setting the file secured content in the first protection data in accordance with the file sharing protection rule by the recoverable file protection device;

moving the file secured content of the first protection data to the customized hidden zone in accordance with the file secured content protection mode of the file sharing protection rule; and saving the first protection data without the file secured content in the normal data zone to form a second protection data.

26. The protection method of the recoverable file as claimed in claim 25 further comprising a step of:
 duplicating a secured content and moving the duplicated secured content to the customized hidden zone.

27. The protection method of the recoverable file as claimed in claim 25 further comprising steps of:
 replacing the secured content with a marked content and saving the marked unprotected data in the normal data zone to form the first protection data.

28. The protection method of the recoverable file as claimed in claim 26 further comprising steps of:
 replacing the secured content with a marked content and saving the marked unprotected data in the normal data zone to form the first protection data.

29. The protection method of the recoverable file as claimed in claim 25, after forming the first protection data, further comprising steps of:
 encrypting the secured content and the file secured content with the authentication key inputted by the user in the recoverable file protection device;
 requesting the user to input the identification verifying data when the recoverable file protection device receives the control signal to open the file; comparing the identification verifying data with the authentication key by the recoverable file protection device;
 moving the secured content and the file secured content from the customized hidden zone and the second protection data from the normal data zone to recover the unprotected data by the file protection program in the recoverable file protection device when the identification verifying data complies with the authentication key; and
 displaying the second protection data by the recoverable file protection device when the identification verifying data does not comply with the authentication key.

30. The protection method of the recoverable file as claimed in claim 29 further comprising a step of:
 duplicating the file secured content and moving the duplicated file secured content to the customized hidden zone.

31. The protection method of the recoverable file as claimed in claim 27, after forming the first protection data, further comprising steps of:
 setting a file sharing protection rule including a file secured content and a file secured content protection mode by the recoverable file protection device;
 setting the file secured content in the first protection data in accordance with the file sharing protection rule by the recoverable file protection device;
 moving the file secured content to the customized hidden zone in accordance with the file secured content protection mode of the file sharing protection rule;
 saving the first protection data without the file secured content in the normal data zone to form a second protection data;
 encrypting the secured content and the file secured content with the authentication key inputted by the user in the recoverable file protection device;
 requesting the user to input the identification verifying data when the recoverable file protection device receives the control signal to open the file;
 comparing the identification verifying data with the authentication key by the recoverable file protection device;
 moving the secured content and the file secured content from the customized hidden zone and the second protection data from the normal data zone to recover the unprotected data by the file protection program in the recoverable file protection device when the identification verifying data complies with the authentication key; and
 displaying the second protection data by the recoverable file protection device when the identification verifying data does not comply with the authentication key.

32. The protection method of the recoverable file as claimed in claim 28, after forming the first protection data, further comprising steps of:
 setting a file sharing protection rule including a file secured content and a file secured content protection mode by the recoverable file protection device;
 setting the file secured content in the first protection data in accordance with the file sharing protection rule by the recoverable file protection device;
 moving the file secured content to the customized hidden zone in accordance with the file secured content protection mode of the file sharing protection rule;
 saving the first protection data without the file secured content in the normal data zone to form a second protection data;
 encrypting the secured content and the file secured content with the authentication key inputted by the user in the recoverable file protection device;

requesting the user to input the identification verifying data when the recoverable file protection device receives the control signal to open the file;

comparing the identification verifying data with the authentication key by the recoverable file protection device;

moving the secured content and the file secured content from the customized hidden zone and the second protection data from the normal data zone to recover the unprotected data by the file protection program in the recoverable file protection device when the identification verifying data complies with the authentication key; and displaying the second protection data by the recoverable file protection device when the identification verifying data does not comply with the authentication key.

33. The protection method of the recoverable file as claimed in claim 30 further comprising a step of:

replacing the file secured content with a marked content and saving the marked first protection data in the normal data zone to form the second protection data.

34. The protection method of the recoverable file as claimed in claim 31 further comprising a step of:

replacing the file secured content with a marked content and saving the marked first protection data in the normal data zone to form the second protection data.

35. The protection method of the recoverable file as claimed in claim 32 further comprising a step of:

replacing the file secured content with a marked content and saving the marked first protection data in the normal data zone to form the second protection data.

\* \* \* \* \*